US012515663B2

(12) United States Patent
Vandenbussche

(10) Patent No.: US 12,515,663 B2
(45) Date of Patent: Jan. 6, 2026

(54) ENVIRONMENTAL TORQUE PROFILE ADAPTATION

(71) Applicant: Lyft, Inc., San Francisco, CA (US)

(72) Inventor: Gregoire Ludovic Vincent Vandenbussche, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 944 days.

(21) Appl. No.: 16/578,162

(22) Filed: Sep. 20, 2019

(65) Prior Publication Data

US 2021/0086769 A1    Mar. 25, 2021

(51) Int. Cl.
*B60W 30/18* (2012.01)
*B60W 10/04* (2006.01)

(52) U.S. Cl.
CPC ............ *B60W 30/18* (2013.01); *B60W 10/04* (2013.01); *B60W 2510/0604* (2013.01); *B60W 2510/08* (2013.01); *B60W 2530/10* (2013.01); *B60W 2552/00* (2020.02); *B60W 2710/0666* (2013.01); *B60W 2710/083* (2013.01); *B60W 2720/106* (2013.01)

(58) Field of Classification Search
CPC .. B60W 30/0956; B60W 30/18; B60W 10/04; B60W 2710/0666; B60W 2710/083; B60W 2510/0604
See application file for complete search history.

(56) References Cited

U.S. PATENT DOCUMENTS

| | | | |
|---|---|---|---|
| 2009/0234552 A1* | 9/2009 | Takeda ................... | G08G 1/167 701/1 |
| 2012/0080249 A1* | 4/2012 | Yates, III ............... | B60L 50/90 701/22 |
| 2014/0039741 A1* | 2/2014 | Tanaka ................... | B60L 15/20 701/22 |
| 2014/0277888 A1* | 9/2014 | Dastoor ................. | B60L 58/22 701/22 |
| 2015/0258898 A1* | 9/2015 | Matsuda .................. | B60L 7/26 701/22 |
| 2016/0014252 A1* | 1/2016 | Biderman ................ | A61G 5/04 701/29.2 |
| 2016/0355189 A1* | 12/2016 | Lin ........................ | B60L 3/0061 |
| 2017/0283003 A1* | 10/2017 | Stählin .................... | B62M 6/45 |
| 2017/0341650 A1* | 11/2017 | Arai ..................... | F02D 41/0002 |

(Continued)

*Primary Examiner* — Toya Pettiegrew
(74) *Attorney, Agent, or Firm* — Baker Botts L.L.P.

(57) ABSTRACT

The disclosed computer-implemented method may include determining, based at least on one or more sensors of the micromobility vehicle, one or more of an environmental condition associated with the micromobility vehicle, a ground surface condition associated with the micromobility vehicle, or a deviation from an expected load of the micromobility vehicle. The method additionally includes determining a torque profile associated with the MV based at least on the one or more of the environmental condition, the ground surface condition, and the deviation from the expected load. The method also includes determining a torque magnitude from the torque profile based at least on a throttle position detected by the MV. The method further includes causing the MV to move based at least on the determined torque magnitude. Various other methods, systems, and computer-readable media are also disclosed.

20 Claims, 12 Drawing Sheets

(56) References Cited

U.S. PATENT DOCUMENTS

| | | | |
|---|---|---|---|
| 2018/0086227 A1* | 3/2018 | Healy | B60L 15/2018 |
| 2019/0300105 A1* | 10/2019 | Marshall | B62J 45/412 |
| 2020/0331520 A1* | 10/2020 | Varunjikar | B60W 40/103 |
| 2020/0361557 A1* | 11/2020 | Zhang | B62J 45/20 |
| 2022/0119073 A1* | 4/2022 | Zubieta Andueza | B60L 15/2045 |

* cited by examiner

ENVIRONMENTAL TORQUE PROFILE ADAPTATION

BACKGROUND

Electronic control units (ECUs) of automotive vehicles typically use torque-based control in which a motor output is adjusted until it matches a torque magnitude (i.e., torque demand) determined based on throttle position. Recently, interest has risen in vehicles that are significantly smaller and lighter in weight, such as micromobility vehicles (MVs). Such vehicles present challenges that are not encountered by larger, heavier automotive vehicles, or that become more significant for an MV. The present disclosure recognizes these challenges and presents solutions that improve MV operation in various ways.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
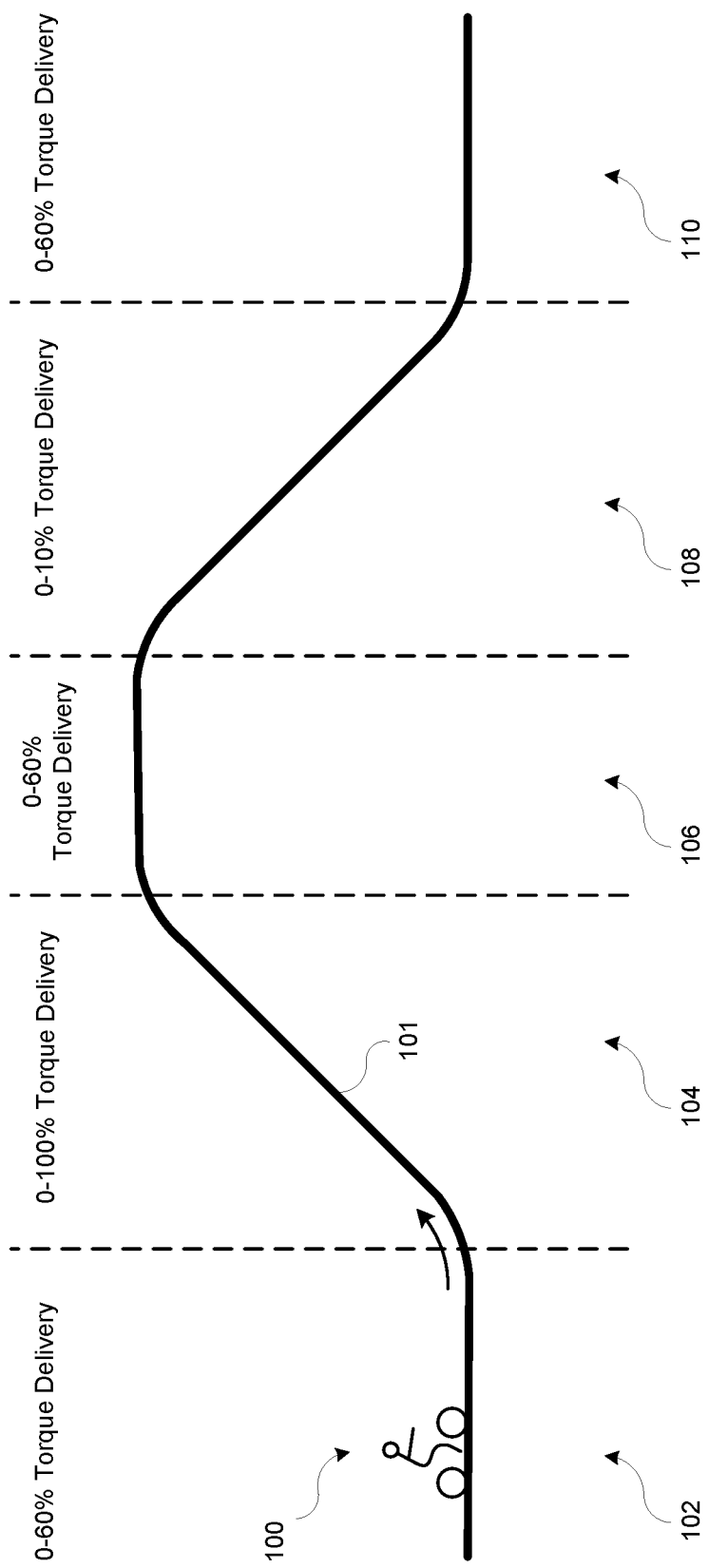
FIG. 1 is a graphical illustration depicting torque delivery based on inclination.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to determining torque magnitude for operating a micromobility vehicle based on one or more of a variety of conditions, such as an environmental condition associated with the micromobility vehicle, a ground surface condition associated with the micromobility vehicle, or a deviation from an expected load of the micromobility vehicle. As will be explained in greater detail below, embodiments of the present disclosure may scale up, scale down, or limit throttle position and/or torque magnitude in response to various conditions.

An electronic control unit may contain mathematical models and maps used to calculate or control the torque output of the motor based on various inputs (e.g., voltage and current for electric motors, mass air flow and engine type for internal combustion engines, etc.). This torque-based control may make driving of vehicles smoother by predicting the amount of motor output torque needed to satisfy driver or cruise control demand and the precise combination of motor control input variables to obtain that result, without having to hunt for a solution by trial and error.

As noted above, electronic control units (ECUs) of automotive vehicles typically use torque-based control in which a motor output is adjusted until it matches a torque magnitude i.e., torque demand) determined based on throttle position. Throttle position can be a degree or amount of actuation of a device controlling the flow of fuel or power to an engine or motor. Torque magnitude can be a size or extent of an amount of torque (e.g., moment or moment of force), which is a tendency of a force to rotate an object (e.g., wheel, tire, etc.) about an axis, fulcrum, or pivot (e.g., vehicle axle). A torque profile (e.g., function, equation, lookup table, etc.) can be used to map throttle position to torque magnitude in such a way that a torque magnitude can be determined based on a throttle position. For large motor vehicles (cars, trucks, etc.) the weight of the vehicle tends to greatly exceed the weight of passengers and cargo, which yields a predictable performance of the vehicle despite typical variations in weight of passengers and cargo. Accordingly, it is possible to develop a torque profile for an average amount of passenger and cargo weight, and the vehicle can operate in a safe and effective manner using the torque profile with typical variations in weight of passengers and cargo.

According to torque-based control, an ECU may contain mathematical models and maps used to calculate or control the torque output of the motor based on various inputs (e.g., voltage and current for electric motors, mass air flow and engine type for internal combustion engines, etc.). This control procedure may make driving of vehicles smoother by predicting the amount of motor output torque needed to satisfy driver or cruise control demand and the precise combination of motor control input variables to obtain that result, without having to hunt for a solution by trial and error.

As also noted above, interest recently has risen in vehicles that are significantly smaller and lighter in weight, such as micromobility vehicles (MVs). For such vehicles, the weight of the driver and cargo is more significant than in relatively larger vehicles when determining throttle response of the vehicle. As a result, modern day MVs, such as electric bikes and scooters, may encounter various problems when a vehicle load deviates from an expected load (a default rider plus cargo weight or default gross vehicle weight for which a torque profile is indexed or calibrated). Additionally, environmental and ground surface conditions can greatly impact MV performance and interfere with a consistent and controlled ride experience.

The following will provide, with reference to FIGS. 1-12, detailed descriptions of systems and methods of operation for a micromobility vehicle. These systems and methods may perform scaling and/or limiting operations based on inclination, weather, vehicle load, and/or battery temperature. The systems and methods may scale and/or limit in a way that may reduce variation in driver experience due to variations in inclination and vehicle load while improving safety in operation of the automotive vehicle.

FIG. 1 is a graphical illustration depicting torque delivery based on an inclination 101. In general, inclination 101 can be an angle of a longitudinal axis of a travel vector of the micromobility vehicle with respect to a plane orthogonal to a gravity vector. As used herein, inclination 101 can refer to a positive degree (e.g., inclined), a negative degree (e.g., declined), or a zero degree (e.g., flat/level) of inclination, and this degree of inclination can govern or impact an amount of torque delivery received by an MV. In some implementations, this impact can be based on a range having an upper threshold (e.g., forty degrees) and a lower threshold (negative forty degrees). An inclinometer reading (e.g., a measured degree of inclination) provided by an inclinometer of the MV can map, via a function or a lookup table, to a limit or a scalar value used to govern MV torque delivery. An example lookup table is set forth below as Table 1.

TABLE 1

| INCLINOMETER READING | TORQUE DELIVERY SCALAR |
|---|---|
| Greater than Forty Degrees | 1.0 |
| Greater than Thirty to Forty Degrees | 0.9 |
| Greater than Twenty to Thirty Degrees | 0.8 |
| Greater than Ten to Twenty Degrees | 0.7 |
| Zero to Ten Degrees | 0.6 |
| Negative Ten to Less than Zero Degrees | 0.5 |
| Negative Twenty to Less than Negative Ten Degrees | 0.4 |
| Negative Thirty to Less than Negative Twenty Degrees | 0.3 |
| Negative Forty to Less than Negative Thirty Degrees | 0.2 |
| Less Than Negative Forty Degrees | 0.1 |

Using the scalar values of Table 1 to scale the torque delivery of the MV, a rider may receive a scaled range of torque delivery. For example, a rider 100 of an MV may receive 0-60% torque delivery when riding on a flat ground surface condition 102 but may receive 0-100% torque delivery when riding on an inclined ground surface condition 104. Then, rider 100 may receive 0-60% torque delivery when riding on a flat ground surface condition 106 but may receive 0-10% torque delivery when riding on a declined ground surface condition 108. Finally, the rider may receive 0-60% torque delivery when riding on a flat ground surface condition 110.

Limit values and/or scalar values may be stored in lookup tables or other data structures for selection based on a reading from an inclinometer of the MV. Alternatively, a continuous function may be used to compute a limit value or scalar value based on the sensed inclination. Such values may be used to limit or scale a throttle position and/or a torque magnitude determined based on the throttle position and a torque profile. In this way, the rider may experience more consistent throttle response over various inclinations, which can improve the rider's experience as well as safety in operation of the MV.

Figure 2:
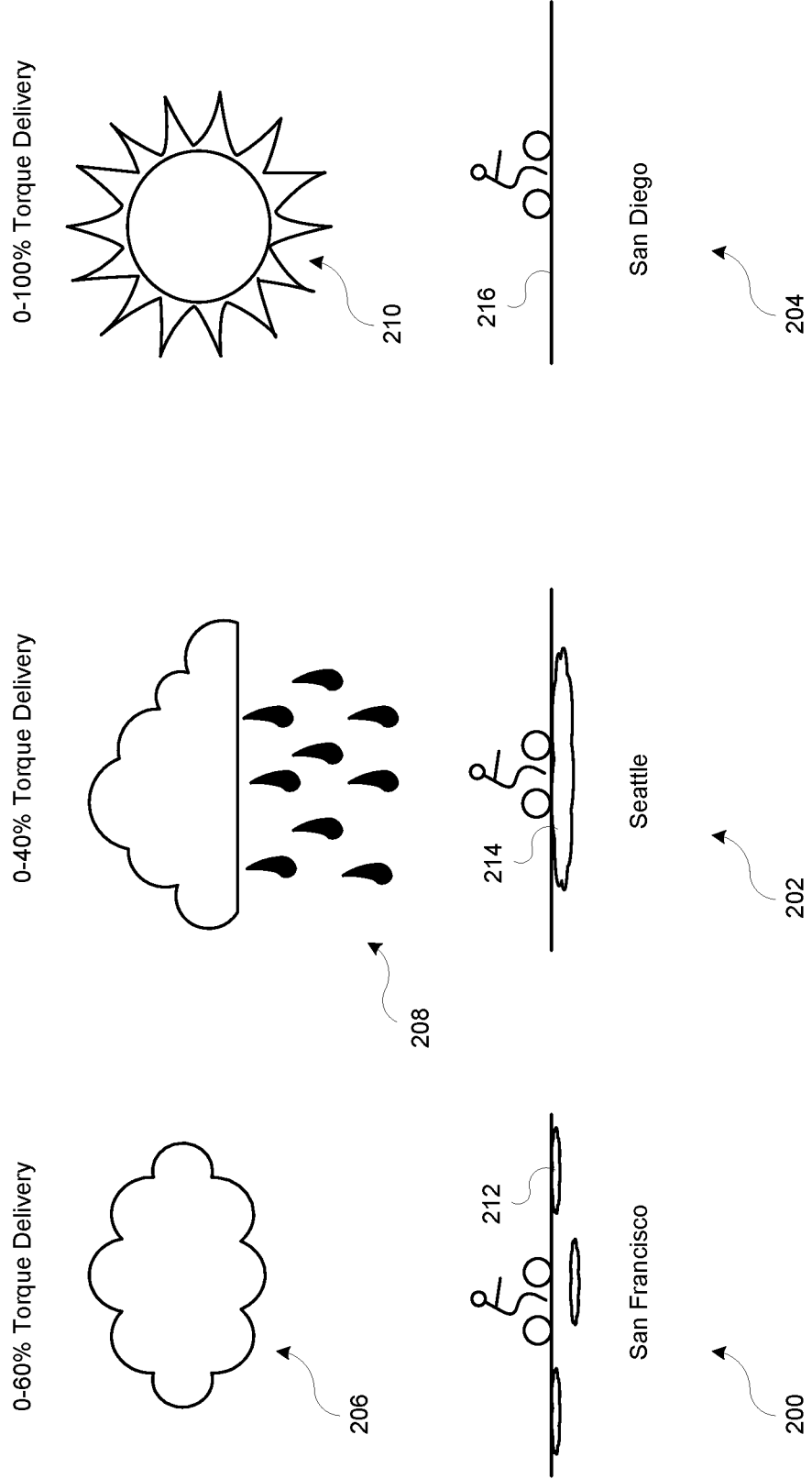
FIG. 2 is a graphical illustration depicting torque delivery based on weather.

FIG. 2 is a graphical illustration depicting torque delivery based on weather corresponding to environmental conditions 206-210 and resulting in ground surface conditions 212-216. For example, an environmental condition 206 corresponding to occurrence of precipitation in a predetermined time window preceding a current time (e.g., recent rain) may result in a ground surface condition 212 corresponding to a ground surface having puddles of water and/or patches of ice. Additionally, an environmental condition 208 corresponding to precipitation (e.g., rain, sleet, or snow) and/or subzero temperatures (e.g., temperatures below zero degrees Celsius) may result in a ground surface condition 214 corresponding to a wet and/or icy ground surface. Also, an environmental condition 208 corresponding to sunny skies may result in a ground surface condition 216 corresponding to a dry ground surface.

According to various implementations, the MV may receive weather information from a weather station (e.g., an observation post where weather conditions and meteorological data are observed and recorded) or weather service (e.g., an entity that provides weather forecasts, warnings of hazardous weather, and other weather-related products to organizations and the public for the purposes of protection, safety, and general information), and/or determine local weather conditions based on environmental sensors of the MV. Weather conditions can be an existing state of the atmosphere at a place and time, such as heat, dryness, sunshine, wind, rain, etc. Weather conditions sensed by sensors of the MV can include temperature and/or humidity, and such weather information can serve as an indication of weather conditions that can include temperature, humidity, precipitation, and/or wind. Accordingly, an MV may receive 0-60% torque delivery in a location 200 in which it rained recently, or 0-40% torque delivery in another location 202 in which it is currently raining and/or conditions are icy. In contrast, the MV may receive 0-100% torque delivery in a location 204 having sunny and dry conditions. Limit values and/or scalar values may be stored in look up tables or other data structures for selection based on received or determined weather conditions.

Other types of conditions, such as vehicle load and battery temperature, can also trigger scaling or limiting of the throttle position or torque magnitude. For example, a difference between an expected and actual vehicle load may be determined at initial vehicle operation and used to increase or decrease torque delivery accordingly. Additionally, a torque delivery operation with a battery temperature that falls outside a temperature range (i.e., is too hot or too cold) for the torque magnitude may cause damage to the battery and possibly an unsafe condition, such as a fire. Thus, throttle position or torque magnitude may be scaled or limited to prevent operation of the motor in a manner that will damage the battery or cause an unsafe condition. Various techniques for applying these scales or limits alone or in combination are described below with reference to FIGS. 7-10.

It should be appreciated that other types of conditions may be used, such as ground surface type. For example, using GPS map data, traffic data, and a determined MV position, the MV may determine a type of ground surface and/or driving condition (e.g., paved, unpaved, uneven or rough pavement, gravel, dirt, work zone, chemical spill, accident site, unknown, etc.). Torque delivery may be scaled or limited using values determined from this type of information.

Figure 3:
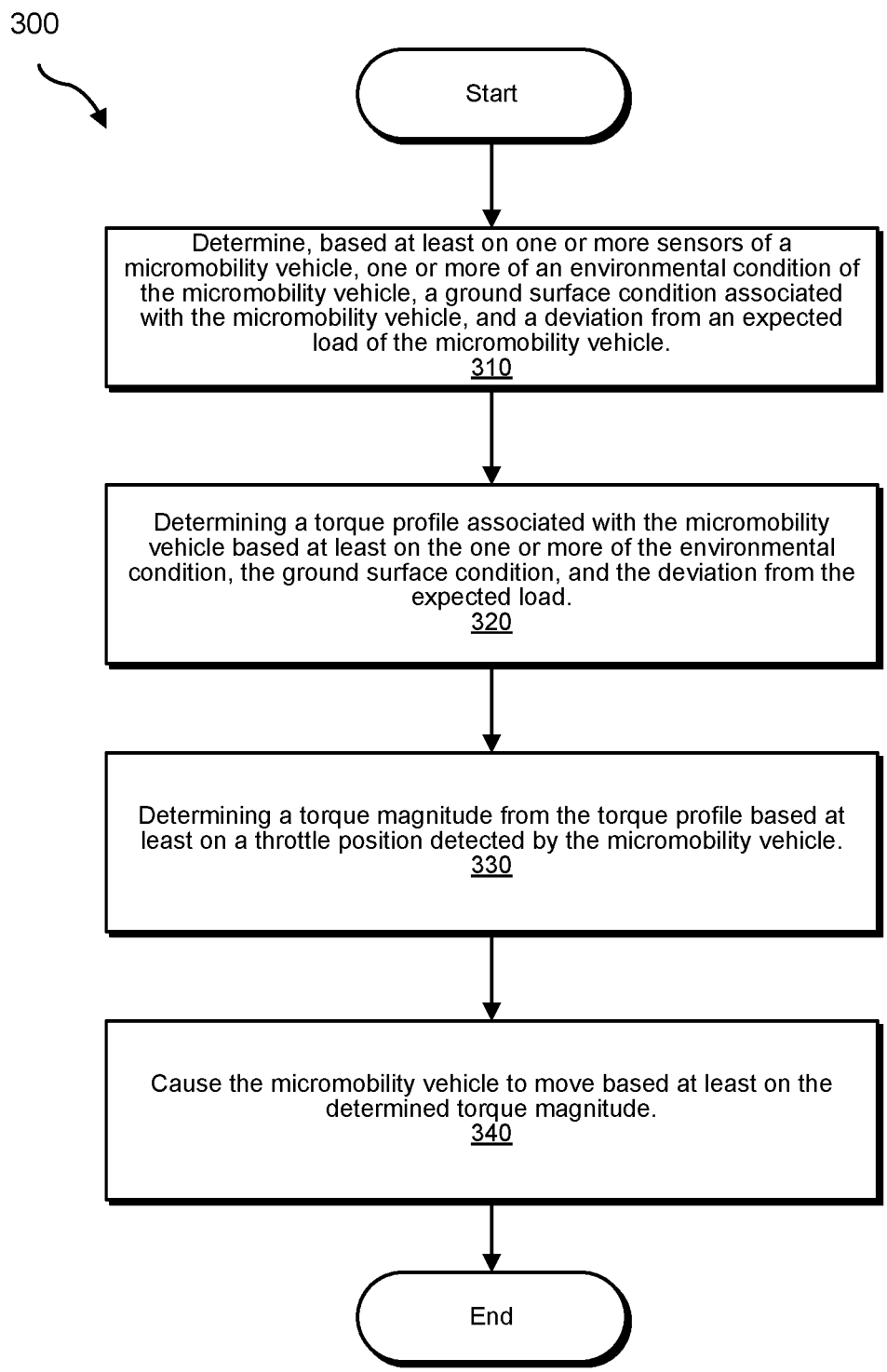
FIG. 3 is a flow diagram of an exemplary method of operation for a micromobility vehicle.

FIG. 3 is a flow diagram of an exemplary method 300 of operation for an MV. The steps shown in FIG. 3 may be performed by any suitable computer-executable code and/or computing system, including the system(s) illustrated in FIGS. 4-12. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may determine, based at least on one or more sensors of the micromobility vehicle, one or more of an environmental condition associated with the micromobility vehicle, a ground surface condition associated with the micromobility vehicle, or a deviation from an expected load of the micromobility vehicle. For example, a processor of the micromobility vehicle may receive an indication (e.g., a signal and/or information) of the ground surface condition or environmental condition. The indication may be received over a wired or wireless connection from one or more sensors, circuitry, or other processors of the micromobility vehicle. Alternatively or additionally, the indication may be received wirelessly via one or more antennas from remote sensors and/or another entity (e.g., weather service, weather station, media source, etc.) over a communications network (e.g., satellite, cellular, WiFi, etc.). In some implementations, an electronic control unit (ECU) of the micromobility vehicle may receive a signal indicative of the ground surface condition or environmental condition. The term "signal" signal may refer to an analog signal (e.g., voltage) and/or a digital data signal. Alternatively or additionally, the ECU may receive information indicative of the environmental condition and/or ground surface condition. Accordingly, and as described in greater detail below, the one or more of an environmental condition and a ground surface condition may include an inclination sensed by an inclinometer of the micromobility vehicle, one or more weather conditions at a location of the micromobility vehicle, and/or a temperature (e.g., ambient air temperature) at a location of the micromobility vehicle. Information indicative of the ground and/or environmental conditions may be stored in a computer memory of the ECU. Processing may proceed from step 310 to step 320.

At step 320, the method may include determining a torque profile associated with the micromobility vehicle based at least on the one or more of the environmental condition, the ground surface condition, and the deviation from the expected load. As described in greater detail below, the ECU of the micromobility vehicle may also use a default torque profile or may use a torque profile based on a skill level of a rider indicated in a rider profile. The torque profile used for the rider may be stored in a computer memory of the ECU. Processing may proceed from step 320 to step 330.

At step 330, the method includes determining a torque magnitude from the torque profile based at least on a throttle position detected by the micromobility vehicle. For example, the ECU may receive a signal indicative of a throttle position (i.e., amount of deflection from a designated zero point). A corresponding torque magnitude may thus be determined from the torque profile. At step 330, either the throttle position or the torque magnitude may be scaled and/or limited based on the environmental condition or ground surface condition stored in the memory of the ECU at step 310. Processing may proceed from step 330 to step 340.

At step 340, the method includes causing the MV to move based at least on the determined torque magnitude. For example, the ECU may utilize the torque magnitude as an input to a torque drive system that controls operation of a motor of the MV, and thus may control operation of the MV in such a way that the output torque of the MV motor is caused to match the input torque magnitude (i.e., torque demand). After step 340, processing may end. Alternatively, processing may return to a previous step in the process, such as step 310.

Various implementations of method 300 may include additional or alternative operations that may be combined in various ways. For example, the one or more of an environmental condition and a ground surface condition may include the inclinometer reading (inclination, declination, or level reading) of the micromobility vehicle. In this case, the determining the torque magnitude at step 330 may include at least one of scaling or limiting at least one of the throttle position or the torque magnitude based on the inclinometer reading (e.g., declination, level reading, or inclination below a threshold) to reduce deviation from a constant velocity at a given throttle position despite inclination changes. Alternatively or additionally, determining the torque magnitude at step 330 may include reducing the at least one of the throttle position or the torque magnitude when the micromobility vehicle is at least one of level or declined.

In an additional or alternative implementation, the one or more of the environmental condition and the ground surface condition may include the one or more weather conditions. In such situations, the determining the torque magnitude at step 330 may include at least one of limiting the torque magnitude or reducing the torque magnitude in response to occurrence of at least one of sub-zero temperatures or precipitation during a particular time period. For example, the particular time period can be a predetermined time window preceding a current time. In this way, torque magnitude can be limited or reduced in response to weather conditions that affect coefficient of friction of a ground surface. A coefficient of friction may be a value that shows the relationship between the force of friction between two objects and the normal reaction between the objects that are involved (e.g., a value that is sometimes used in physics to find an object's normal force or frictional force when other methods are unavailable). Additionally or alternatively, at step 310, the one or more weather conditions may be received wirelessly from a weather station or other networked information source.

In an additional or alternative implementation, the one or more of the environmental condition and the ground surface condition may include the temperature. In these examples, determining the torque magnitude at step 330 may include at least one of limiting the torque magnitude or reducing the torque magnitude in a manner configured to prevent damage to a battery of the micromobility vehicle. Electrical batteries may be able to safely provide a particular maximum level of voltage or electrical power when the battery temperature and or ambient temperature is in an optimal range. However, when temperatures are too hot or too cold, the battery can suffer damage if the operated at the maximum level of voltage and/or electrical power. Accordingly, limits and/or scalar values may be predetermined for associated temperature conditions to reduce an amount of torque delivery available to the MV to a degree that ensures that the motor will not be operated with a voltage or electrical power draw that could cause damage to the battery during the associated temperature conditions. Therefore, a limit and/or scalar value may be determined based on sensed battery temperature and/or ambient temperature (e.g., sensed or indicated), and this limit and/or scalar value may be applied to the torque magnitude used to operate the motor.

As noted above, the MV can avoid drawing an amount of voltage and/or electrical power when the battery temperature or ambient temperature is too high or too low for that amount of voltage and/or electrical power to be drawn without damage to the battery. For example, the damage to the battery may be prevented when the temperature falls outside a temperature range for safe battery operation at an operational setpoint required to satisfy a torque magnitude above a temperature adjusted threshold. The operational setpoint may be a desired or target value for a variable of a system, which may be used to describe a standard configuration or norm for the system. In this context, a voltage and/or electrical power for driving the motor may be viewed as an operational setpoint, and the threshold may be a threshold voltage beyond which the battery operation is considered unsafe because the battery will be damaged. This threshold may be decreased in a predetermined manner in response to measured temperature (e.g., amount by which the temperature falls below a predetermined temperature, such as a subzero temperature, and/or exceeds a predetermined temperature, such as a predetermined offset from a battery-specific combustion condition), which may be an ambient temperature or a battery temperature as detailed herein with reference to FIG. 5. Accordingly, the temperature may correspond to at least one of a received weather condition, a sensed ambient temperature, or a sensed battery temperature. When a torque demand requires a drive voltage that exceeds the threshold, the drive voltage may be limited so as not to exceed the threshold. Accordingly, a scalar value or limit value may be selected based on the temperature to prevent operation of the motor in a manner that would damage the battery.

In an additional or alternative implementation, the one or more of the environmental condition and the ground surface condition may include the deviation from the expected vehicle load. In such examples, determining the torque magnitude at step 330 may include at least one of scaling or limiting at least one of the throttle position or the torque magnitude in a manner configured to reduce deviation from an expected micromobility vehicle response to demanded torque. The expected response may be a reaction of the MV that is anticipated under controlled conditions (e.g., flat ground, maximum throttle position, a vehicle load, etc.). Further details regarding the expected responses and deviations are provided below with reference to FIG. 5. Alternatively or additionally, the deviation from the expected vehicle load may be determined, at step 310, at initial operation of the micromobility vehicle. The initial operation may occur at a time when a rider operates the MV under controlled conditions (e.g., flat ground and maximum throttle position). This determination may be made, for example, by comparing a change in vehicle position to a vehicle position that was expected in view of the expected load, an initial torque magnitude, and an initial passage of time. The initial passage of time may be a predetermined amount of time (e.g., three seconds, five seconds, etc.) during which the initial operation takes place. A further alternative is to store the deviation from the expected load in a user profile and employ the stored deviation in a subsequent driving operation. The subsequent driving operation may be a next time the same rider uses the MV or a different MV. For example, the stored deviation may be employed to determine an initial torque magnitude for a subsequent driving operation. Alternatively or additionally, at step 330, the torque magnitude may be increased (e.g., multiplied by a scalar value greater than one) for heavier than expected loads and reduced (e.g., multiplied by a scalar value less than one) for lighter than expected loads.

Figure 4:
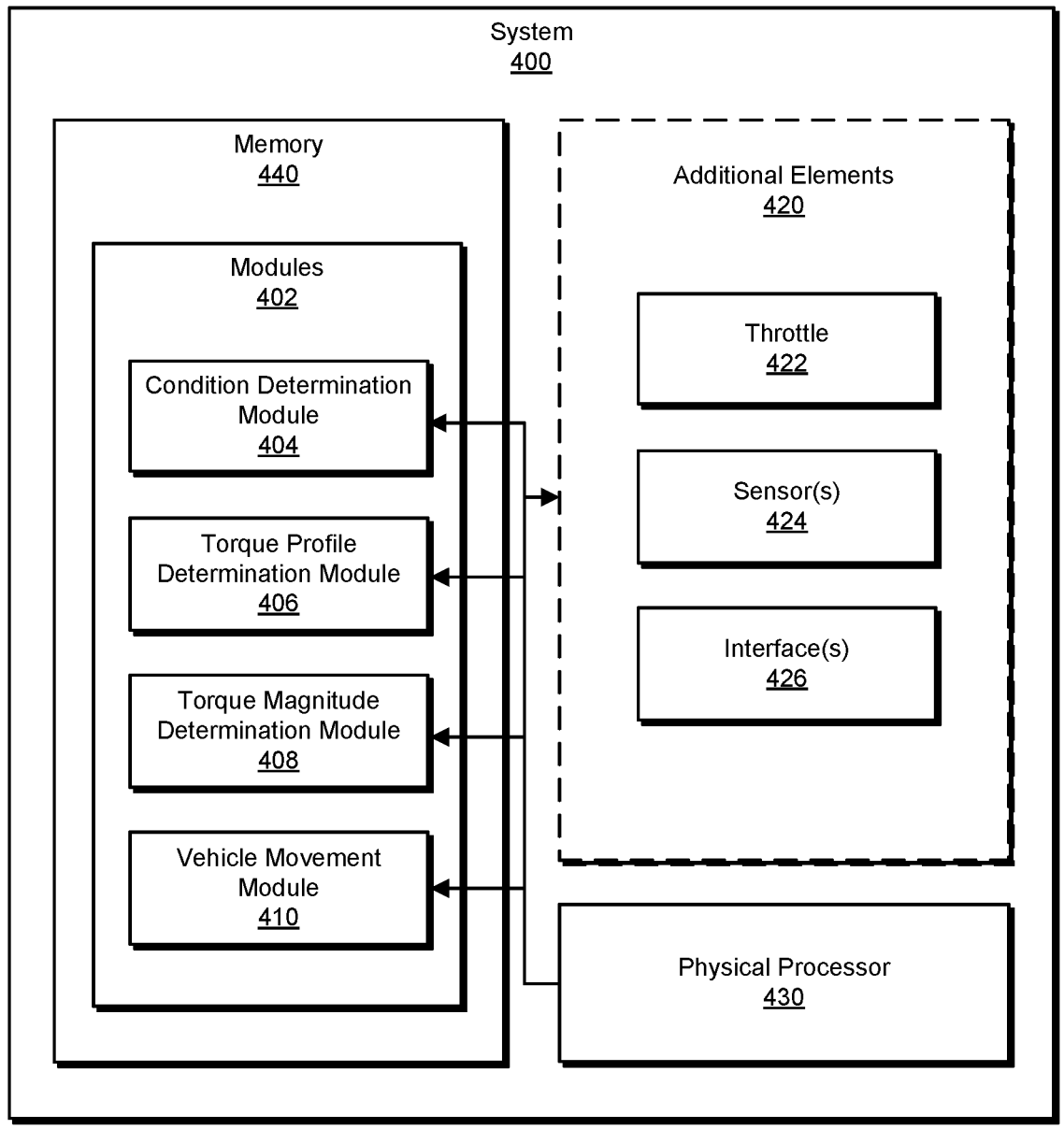
FIG. 4 is a block diagram illustrating a system for operating a micromobility vehicle.

FIG. 4 is a block diagram illustrating a system 400 for operating a micromobility vehicle. System 400 includes a physical (e.g., hardware) processor 430 in communication with a memory 440 and additional elements 420. Memory 440 may store various modules 402 that include instructions for causing processor 430 to carry out the operations of method 300 (see FIG. 3). The term "operations," in some examples, generally refers to any instructions that cause a computer processor to carry out the described logical functions, dedicated circuitry that carries out the described logical functions, or combinations thereof. For example, condition determination module 404 may include instructions that cause processor 430 to carry out operations detailed above with respect to step 310 (see FIG. 3). In operation, determination module 404 may cause processor 430 to receive signals from throttle 422, one or more sensors 424 of the micromobility vehicle, and/or various information sources, as detailed above. In this regard, interfaces 426 may include a component that enables processor 430 to interface with the one or more sensors 424 of the micromobility vehicle. An example of interface 426 may be an analog to digital converter (ADAC) that converts an analog signal from at least one of the one or more sensors 424 of the micromobility vehicle into a digital signal for processor 430.

Additionally, torque profile determination module 406 may have instructions that cause processor 430 to carry out operations detailed above with respect to step 320. In operation, module 406 may cause processor 430 to select a torque profile to be used with a current rider, and this selection may be based on a rider skill level indicated in a rider profile obtained via interfaces 426, which may include one or more antennas or user interfaces. The torque profile may be saved in memory 440.

Also, torque magnitude determination module 408 may include instructions that cause processor 430 to carry out operations detailed above with respect to step 330 in FIG. 3. In operation, module 408 may cause processor 430 to scale or limit a throttle position and/or a torque magnitude determined from the throttle position and the torque profile. The values for scaling or limiting may be determined using continuous functions, lookup tables, and/or other data structures based on the determined conditions.

Further, vehicle movement module 410 may include instructions that cause processor 430 to carry out operations detailed above with respect to step 340 (see FIG. 3). In operation, module 410 may cause processor 430 to utilize the torque magnitude output by module 408 as an input to a torque drive system of the MV.

Figure 5:
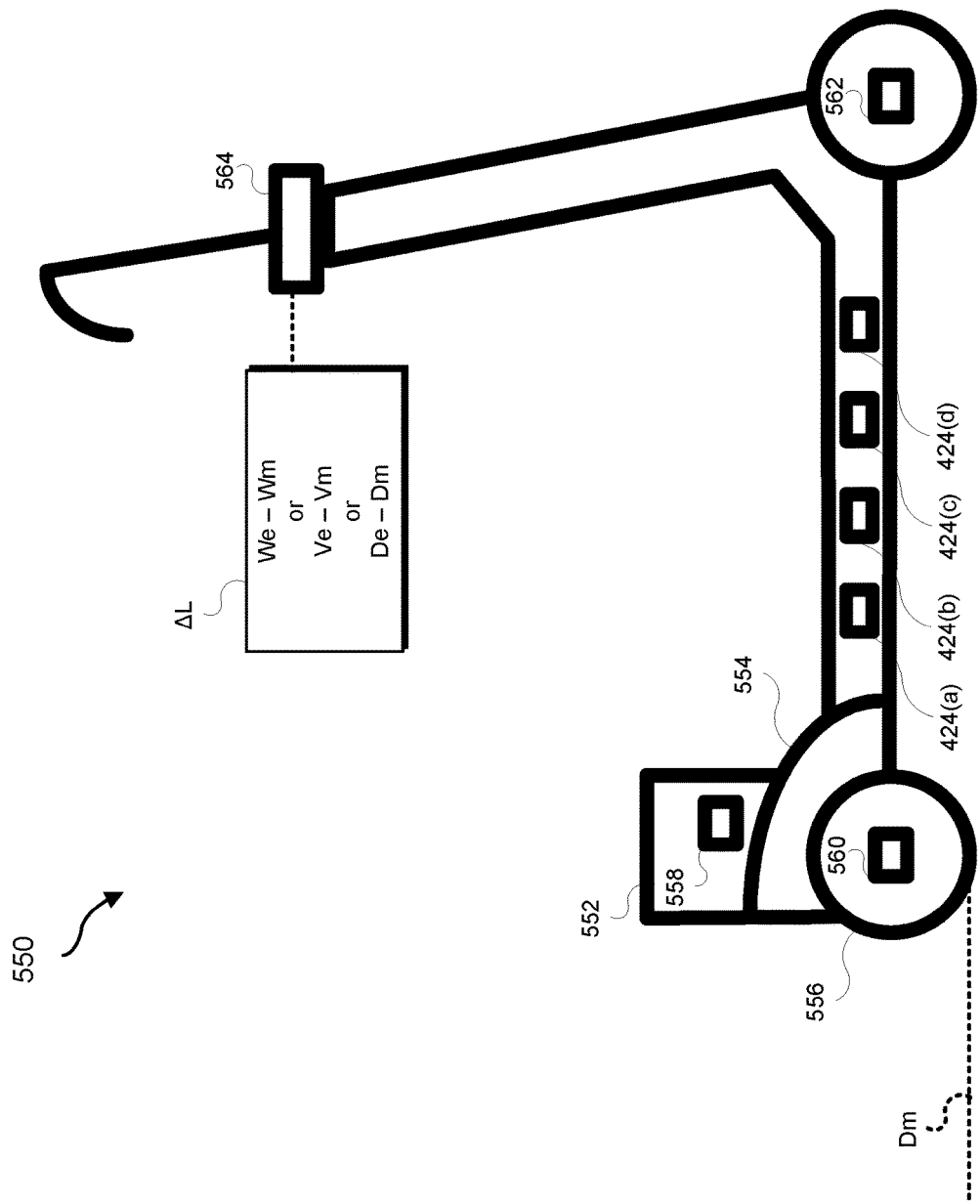
FIG. 5 is a block diagram providing a diagrammatic view of a micromobility vehicle.

FIG. 5 a diagrammatic view of a micromobility vehicle 550 having a battery 552 and a motor 554 configured to drive one or more wheels 556. Motor 554 may be an electric motor, and battery 552 may be a container with of one or more cells in which chemical energy is converted into electricity and used as a source of power for motor 554. Battery 552 may have a temperature sensor 558 disposed therein or attached to battery 552, and temperature sensor 558 may be configured to sense a temperature of the battery. Vehicle 550 may also have an angular velocity sensor 560 attached to one or more of wheels 556, and angular velocity sensor 560 may be configured to measure an angular velocity of one or more of wheels 556. Additional sensors of vehicle 550 can include an accelerometer 424(*a*), a global positioning system (GPS) sensor 424(*b*), one or more weather sensors 424(*b*) (e.g., temperature and/or humidity sensors), an inclinometer 424(*c*) (e.g., a gyroscope), and a weight sensor 562 configured to measure weight of a rider and/or cargo. Vehicle 550 may also have an electronic control unit (ECU) 564 that may be connected to battery 552, motor 554, and sensors 424(*a*)-424(*d*), 560, and 562 via a communications bus.

A temperature sensor of the one or more weather sensors 424(b) can be attached to a part of vehicle 550, such as a frame of vehicle 550 at a position away from the battery 552, motor 554, ECU 564, and any other components of vehicle 550 that generate heat. Thus, sensor 424(b) may measure ambient air temperature in a vicinity of vehicle 550. Other sensors may also be attached to the vehicle frame or paired with or integrated into ECU 564. ECU 564 may use measurements provided by the sensors in various ways.

One way that ECU 564 can use information provided by the sensors is to use measurements from accelerometer 424(a), GPS sensor 424(b), and/or weight sensor 562 to determine a deviation (ΔL) from an expected vehicle load. The expected load can be a default rider plus cargo weight (e.g., 150 lbs.) or a default gross vehicle weight (e.g., 225 lbs.) for which a torque profile is indexed or calibrated. One or more values, such as an expected weight value (We), an expected distance value (De), and/or an expected velocity value (Ve), can be stored to represent this expected load in a useful way. When an actual vehicle load is measured or determined, one or more values representing the actual load, such as a measured weight value (Wm), a measured distance value (Dm), and/or a measured velocity value (Vm) can be compared to the one or more stored values representing the expected load. A scalar value or limit value can be determined based on a result (e.g., difference) of the comparison.

In one example, a rider and/or cargo weight can be measured using a weight sensor 562 of the MV, and the deviation (ΔL) can be determined by comparing the measured weight value (Wm) and the stored expected weight value (We). Alternatively or additionally, the deviation (ΔL) can be determined by comparing an expected velocity value (Ve) with a measured velocity value (Vm). The measured velocity value (Vm) can be determined from measurements taken by accelerometer 424(a) and/or GPS sensor 424(b) when the vehicle 550 is travelling on a flat surface at a maximum throttle position when a rider first operates the vehicle 550. Alternatively or additionally, the deviation (ΔL) can be determined by comparing an expected distance value (De) with a measured distance value (Dm). The measured distance value (Dm) can be determined from measurements taken by accelerometer 424(a) and/or GPS sensor 424(b) when the vehicle 550 is travelling for a predetermined period of time on a flat surface at a maximum throttle position when a rider first operates vehicle 550.

Figure 6:
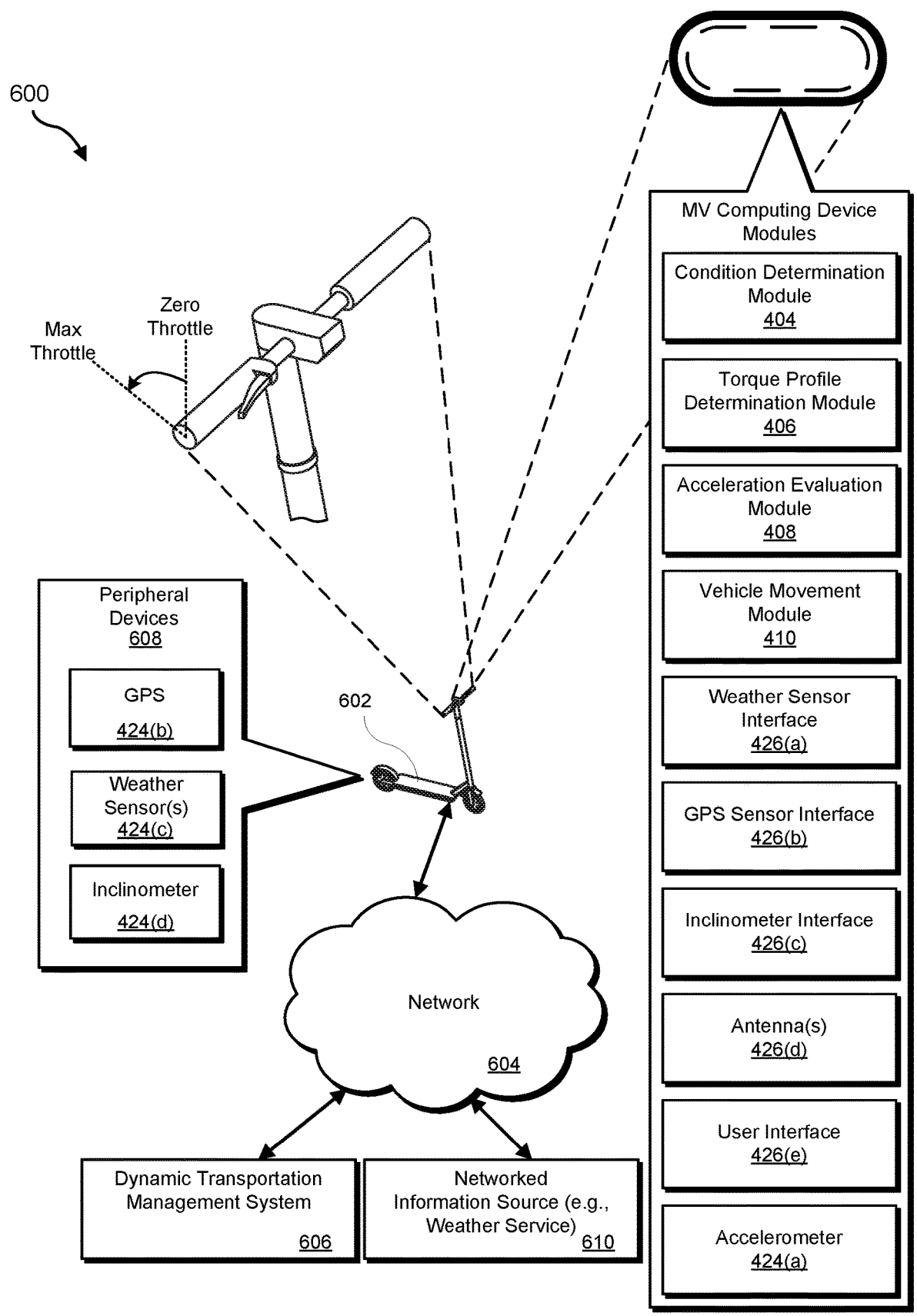
FIG. 6 is a block diagram illustrating an example system for operating a micromobility vehicle having mounted computing devices that include one or more antennas.

FIG. 6 is a block diagram illustrating an example system 600 for operating a micromobility vehicle (MV) 602 having mounted computing devices that include one or more antennas 426(d). MV 602 may use the antennas 426(d) to communicate with a dynamic transportation management system 606 and/or a networked information source 610 (e.g., weather service, weather station, etc.) over a wireless network 604, such as a cellular network or the Internet. A networked information source 610 may be a place, person, or thing from which information (e.g., weather, traffic, news, map data, road construction data, etc.) can be obtained over a communications network (e.g., internet, WiFi, cellular, satellite, etc.). MV 602 may also have a user interface 426(e), such as a touchscreen or docking station for a rider's computing device (e.g., smartphone) and/or may use antennas 426(d) to interface with a rider's computing device. Accordingly, a rider may create, access, and/or update a rider profile stored as user data at dynamic transportation management system 606, which is described in detail below with reference to FIGS. 11 and 12. Additionally, MV 602 may obtain weather information from information source 610, such as a local weather station.

The mounted computing devices may also include modules 404-410, as previously described, accelerometer 424(a), and various interfaces 426(a)-426(c) for communicating with peripheral devices 608 that may include one or more sensors of the MV. The sensors may include any of a variety of sensors that may provide information useful for predicting the relationship between torque magnitude and the performance of the MV. Examples of sensors that may be coupled to the MV include GPS 424(b), weather sensor 424(c), and inclinometer 424(d). Some of these and or others of the one or more sensors of the MV (e.g., GPS 424(b) and/or antennas 426(d)) may be used to determine vehicle position and measure a distance traveled during initial vehicle operation to assess vehicle load. For example, module 404 may cause processor 430 to operate wireless antennas 426(d) to carry out wireless position determination operations (e.g., received signal strength indication (RSSI), fingerprinting, angle of arrival, time of flight, etc.). Module 406 may cause processor 430 to carry out positioning measurements (e.g., GPS or wireless) and determine vehicle load from such measurements over time.

Figure 7:
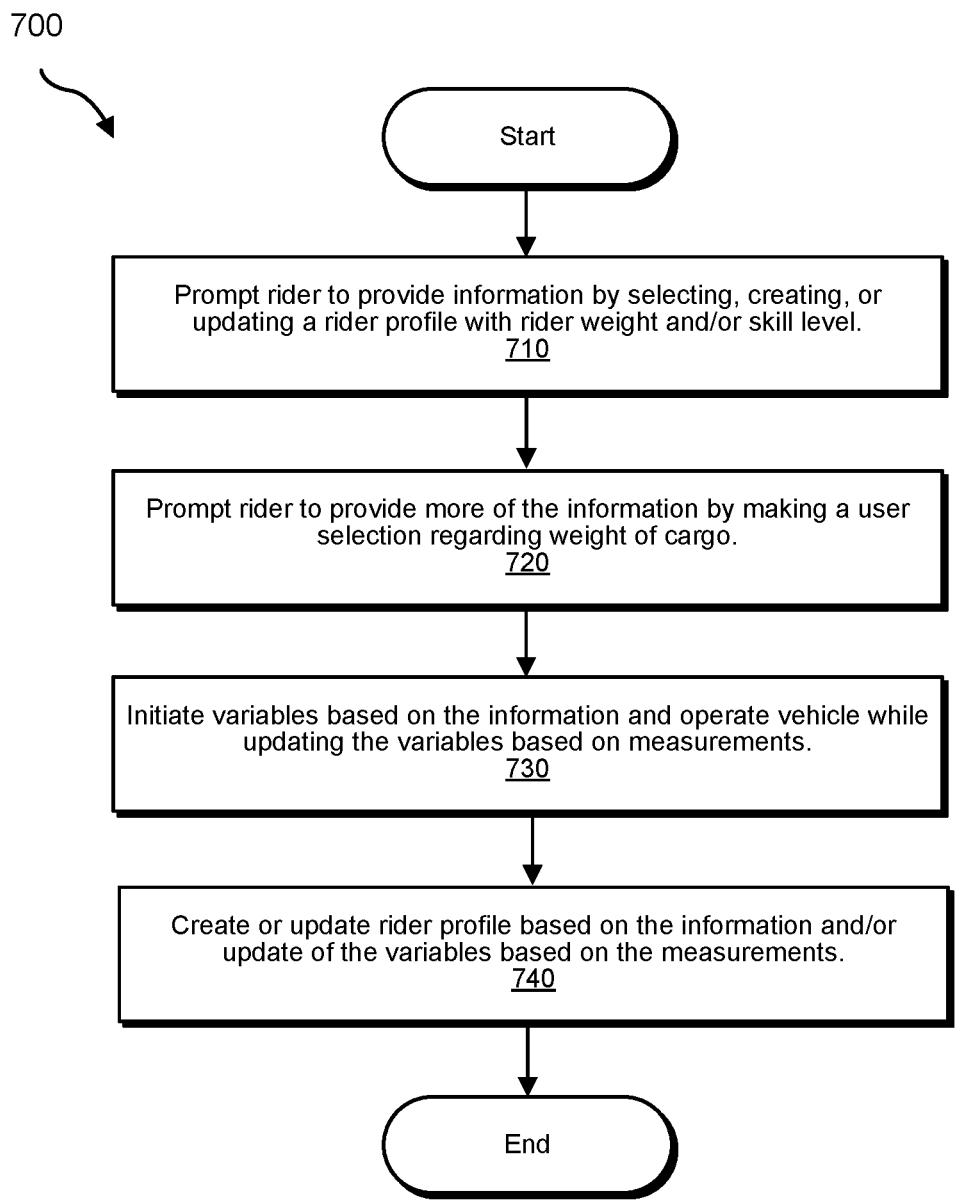
FIG. 7 is a flow diagram of an exemplary method of implementing a rider profile.

FIG. 7 is a flow diagram of an exemplary method 700 of implementing a rider profile. At step 710, method 700 includes prompting a rider to provide information by selecting, creating, or updating a rider profile with rider weight and/or skill level. An existing rider profile selected by the rider may be obtained from user data stored on a dynamic transportation management system, such as management system 606 in FIG. 6, as described below with reference to FIGS. 11 and 12. The rider profile information may be stored in memory of the MV ECU during a ride. Processing may proceed from step 710 to step 720.

At step 720, method 700 includes prompting a rider to provide more of the information by making a user selection regarding weight of cargo. For example, the rider may be prompted to indicate whether the rider is carrying any cargo. If the rider response indicates that cargo is being carried, then an additional prompt may ask the rider to select a weight range for the cargo (e.g., less than 25 pounds, 25 pounds to 50 pounds, etc.). The rider's responses can be stored in memory of the MV ECU. Processing may proceed from step 720 to step 730.

At step 730, method 700 includes initiating variables based on the information and operating the MV while updating the variables based on measurements. For example, the rider skill level may be used to select a target acceleration profile, with more skilled riders being provided with a more aggressive acceleration profile. Additionally, a rider weight and cargo weight may be added and used to select, via a lookup table or other data structure, a scalar or limit value for determining the torque magnitude. If this information is not available, a less aggressive acceleration profile and a default value may be used initially to ensure safe operation, even for an unskilled rider of exceptionally low weight. Other scalar or limit values may be selected that are suitable for initial operation of the MV, as described above. The vehicle may then be operated initially in a safety mode on level ground so that vehicle load can be accurately assessed and the vehicle load information can be updated accordingly. Once this assessment has occurred, then if the rider frequently maximizes the throttle position, a higher skill level may be assigned and a more aggressive acceleration profile utilized. Addition and/or removal of cargo during the ride may be detected by assessing vehicle position changes when operating on level ground as indicated by the inclinometer, and the vehicle load may be updated accordingly. Processing may proceed from step 730 to step 740.

At step 740, method 700 includes creating or updating a rider profile based on the information and/or update of the variables based on the measurements. For example, if the rider chose to create a rider profile and provide a rider weight at step 710, if the rider indicated no cargo, and if no addition of cargo was detected during the ride, then the vehicle load determination that resulted from measurements during the ride, or a corresponding weight, may be stored in a rider profile as rider weight. Otherwise, if the rider chose to create a rider profile and provide a rider weight, but the rider indicated presence of cargo, or if addition of cargo was detected during the ride, then the rider weight provided by the rider may be stored in a rider profile as rider weight. If the rider did not create or select a profile, and if no addition of cargo was detected during the ride, then the determined vehicle load that resulted from measurements during the ride, or a corresponding weight, may be stored in a rider profile as rider weight. Storing this information as rider weight may be conditioned on prompting the rider to confirm that there was little or no cargo, and if the rider indicates that there was cargo, then the rider may be offered another opportunity to create a rider profile. A same or similar procedure may be used for riders who select a rider profile at step 710 and indicate no cargo at step 720, but for whom a determined vehicle load is significantly different than expected based on the rider weight of the profile. If lighter than expected, the rider weight of the profile may be reduced (e.g., multiplied by a scalar value less than one). If heavier than expected, the rider may be prompted to confirm that no cargo was carried or added before increasing the rider weight of the profile. A selected or detected rider skill level may also be saved in the rider profile. The created or updated rider profile may be stored as part of user data stored on a dynamic transportation management system 606 (see FIG. 6) as described below with reference to FIGS. 11 and 12.

Figure 8:
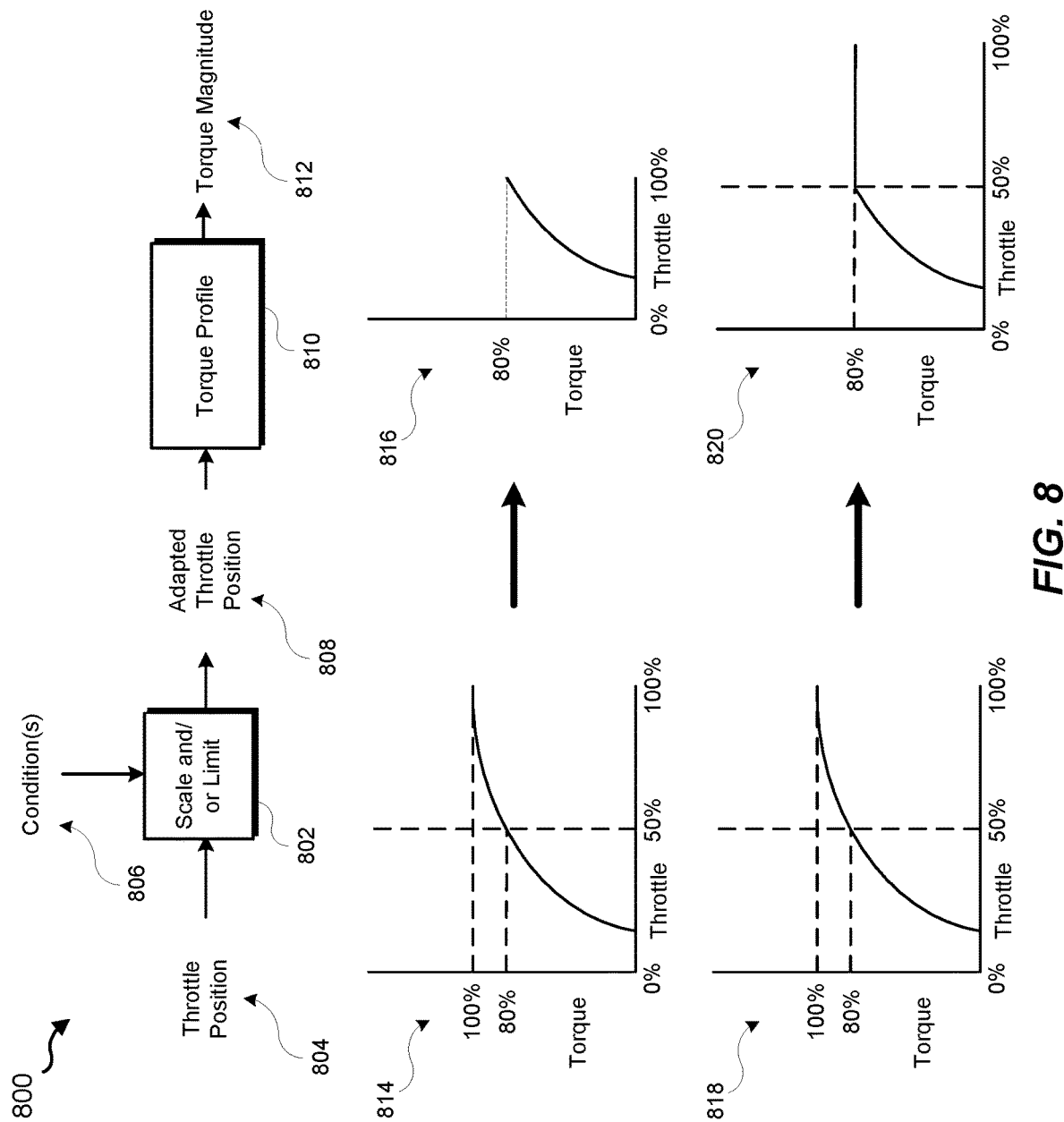
FIG. 8 is a block diagram with graphical illustrations depicting scaling or limiting of throttle position.

FIG. 8 is a block diagram with graphical illustrations depicting scaling or limiting of throttle position. A system 800 for scaling or limiting throttle position 804 may do so based on one or more conditions 806, as discussed above. Accordingly, an output of the throttle position modification module 802 is an adapted throttle position 808. This adapted throttle position 808 is used to generate a torque magnitude 812 based on the torque profile 810. As shown in FIG. 8, scaling of throttle position for torque profile 814 results in a different throttle response 816 than is expected when using the torque profile 814. Moreover, scaling throttle by 50% can still yield a different range of torque output, such as 0-80%. A result can be a much more aggressive throttle response for an already aggressive, non-linear torque profile. Conversely, limiting the throttle position at 50% for torque profile 818 maintains the torque profile curvature for the first 50% of throttle deflection but results in truncation of torque profile 820 in a way that makes the throttle seem nonresponsive for throttle deflection above 50%. Again, the 50% throttle position limitation may only reduce the maximum torque output of this aggressive profile to 80%, and a different result would obtain a different torque profile. Thus, scaling or limiting the throttle position may need to be done with care and may be tailored to the torque profile that is being utilized for the rider.

Figure 9:
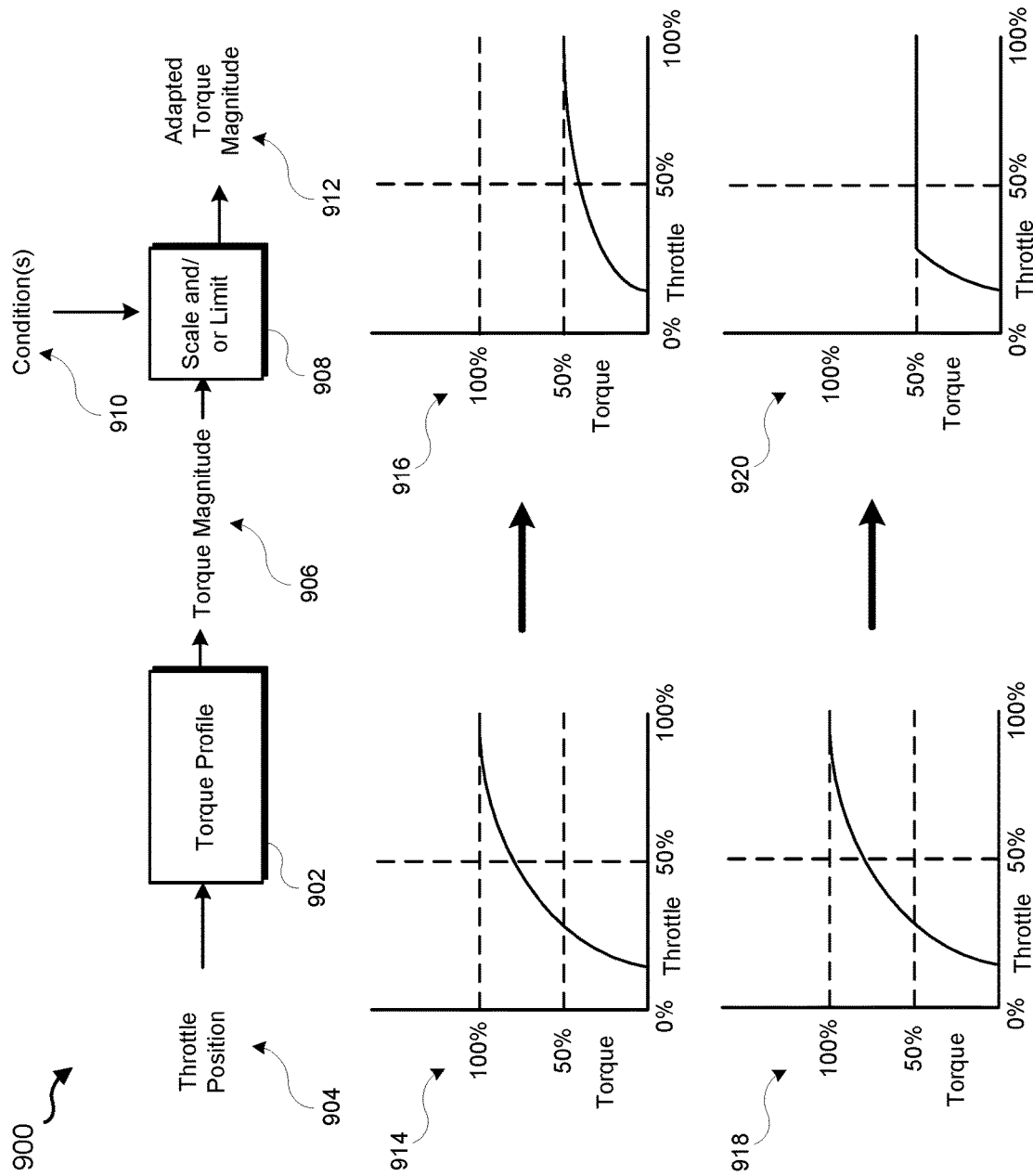
FIG. 9 is a block diagram with graphical illustrations depicting scaling or limiting of torque magnitude.

FIG. 9 is a block diagram with graphical illustrations depicting scaling or limiting of torque magnitude. A system 900 for scaling or limiting torque magnitude 906 may do so based on one or more conditions 910, as discussed above. Accordingly, when a throttle position 904 is used to determine a torque magnitude 906 based on a torque profile 902, the resulting torque magnitude 906 may be input to a torque magnitude modification module 908 that applies scalar or limit values to the torque magnitude 906 based on the conditions 910. The resulting output of module 908 is an adapted torque magnitude 912, which may serve as input to a torque drive system. As shown in FIG. 9, scaling of torque magnitude 906 determined using torque profile 914 may maintain an expected throttle response 916 when using the torque profile 914. Moreover, scaling torque by 50% may yield a resulting range of torque that is consistent for various torque profiles. Conversely, limiting the torque magnitude at 50% for torque profile 918 may maintain the torque profile curvature for a small portion of initial throttle deflection but may result in truncation of the torque profile at 920 in a way that makes the throttle seem nonresponsive except in a markedly small region of throttle travel. Thus, in some examples, scaling of torque magnitude may be advantageous over other techniques that may be used, as it may preserve a torque profile curvature over a reduced torque range and may produce predictable results with various types of torque profiles.

Figure 10:
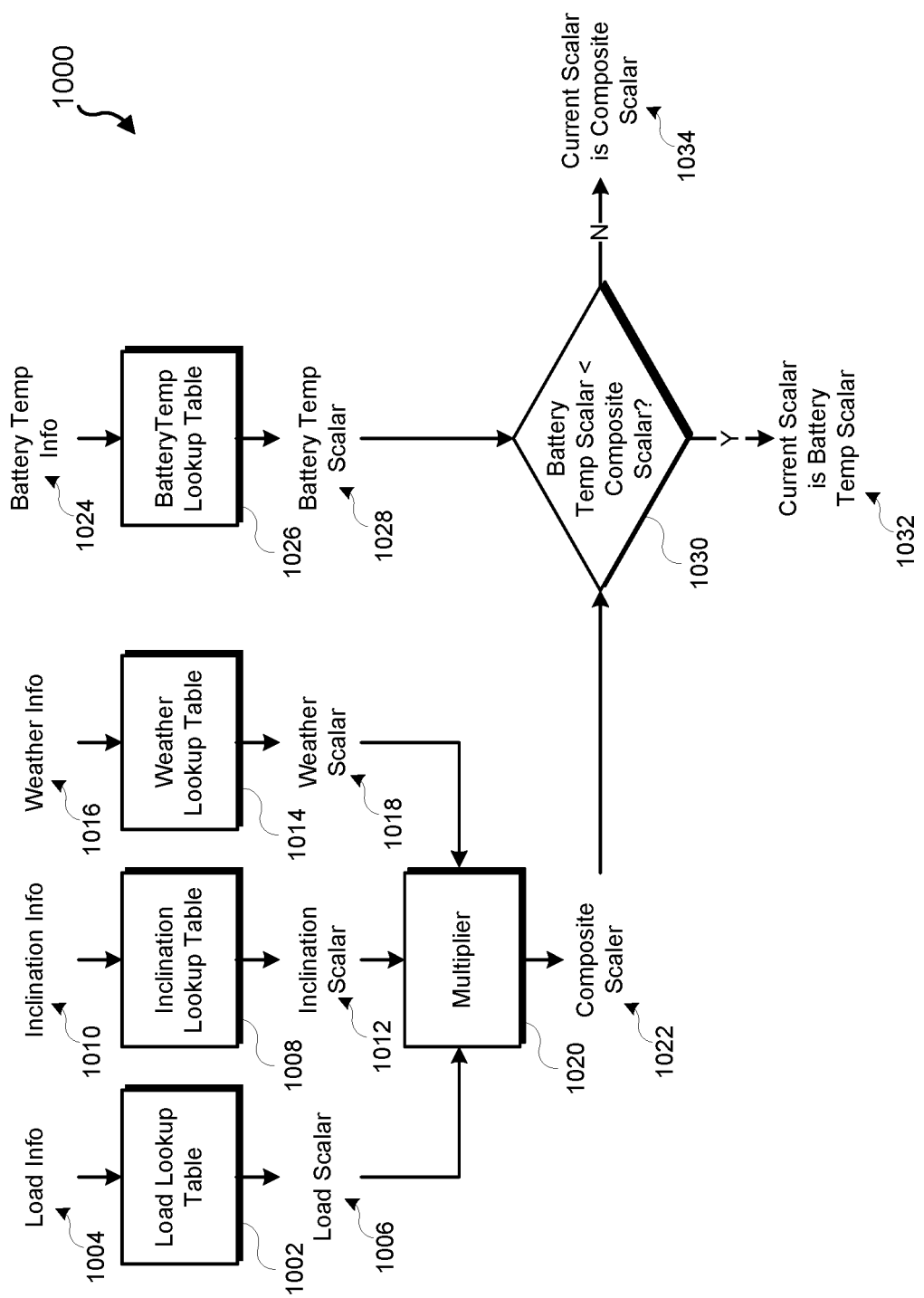
FIG. 10 is a block diagram illustrating an example of scaling of torque magnitude based on multiple conditions.

FIG. 10 is a block diagram illustrating an example system 1000 for scaling of torque magnitude based on multiple conditions. In this example implementation, various lookup tables 1002, 1008, 1014, and 1026 may be used to look up values of scalar 1006, 1012, 1018, and 1028 based on various conditions 1004, 1010, 1016, and 1024. For example, a load lookup table 1002 may be used to determine a load scalar 1006 from load information 1004. Additionally, an inclination lookup table 1008 may be used to determine an inclination scalar 1012 from inclination information 1010. Also, a weather lookup table 1014 may be used to determine a weather scalar 1018 from weather information 1016. These scalars 1006, 1012, and 1018 may be combined into a composite scalar 1022 using a multiplier 1020. However, for a battery temperature scalar 1028 determined from battery temperature information 1024 using battery temperature lookup table 1026, it may be desirable to apply this scalar 1028 only if the composite scalar 1022 is not already lower than the battery temperature scalar 1028. Accordingly, a determination may be made, at block 1030, if the battery temperature scalar 1028 is lower than the composite scalar 1022. If so, then battery temperature scalar 1028 may be used as a current scalar 1032 to scale the torque magnitude instead of the composite scalar. Otherwise, the composite scalar may be used as another current scalar 1034 to scale the torque magnitude.

Figure 11:
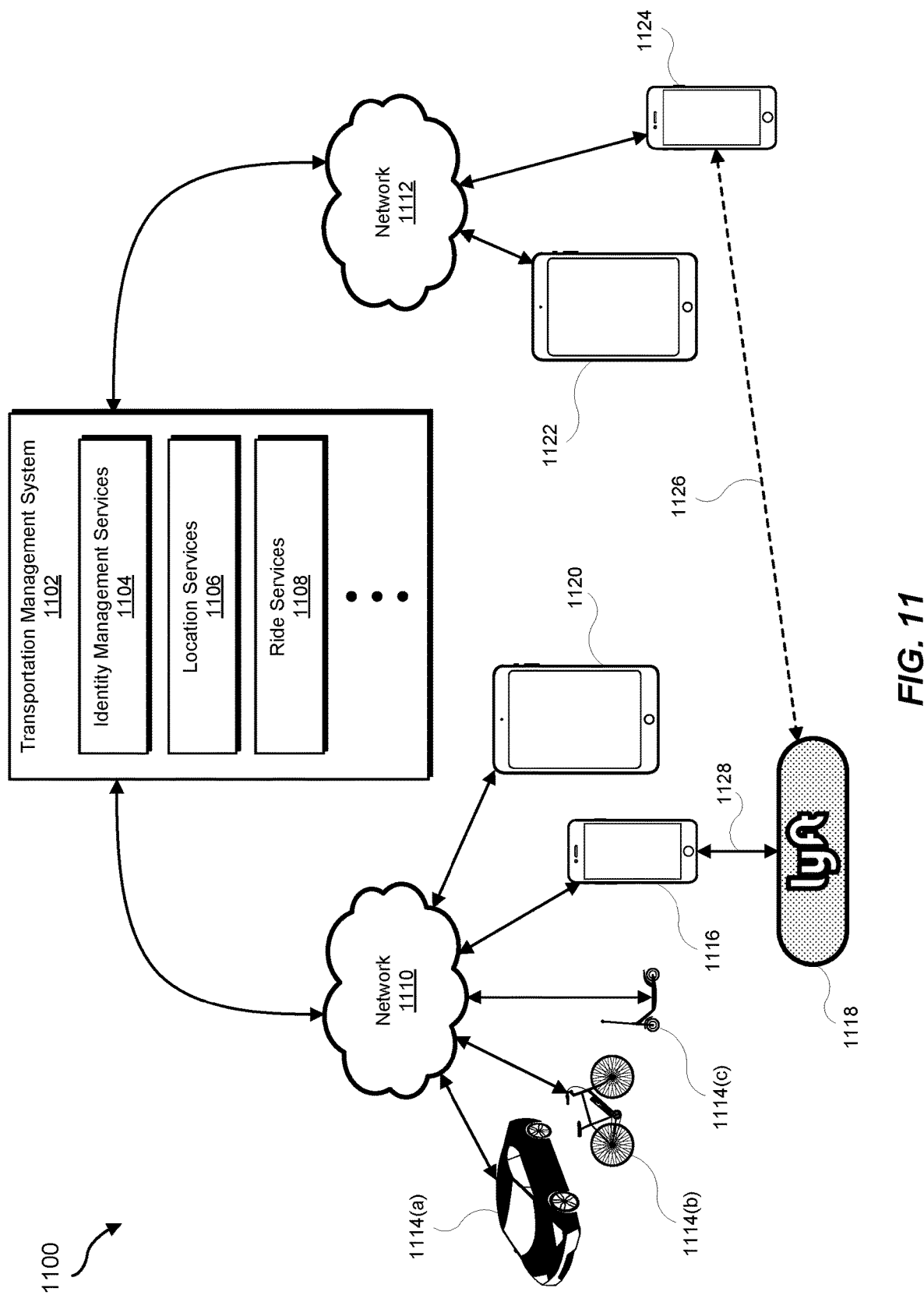
FIG. 11 shows a transportation management environment in accordance with various embodiments.

FIG. 11 shows a transportation management environment 1100 in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(*a*), 1114(*b*), and/or 1114(*c*), provider computing devices 1116 and tablets 1120, and transportation management vehicle devices 1118), and/or one or more devices associated with a ride requestor (e.g., the computing devices of the requestor 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the credentials of the user). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity of a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114(*a*), vehicle 1114(*b*), vehicle 1114(*c*), provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114(*a*), vehicle 1114(*b*), and/or vehicle 1114(*c*)), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114(*a*), vehicle 1114(*b*), and/or vehicle 1114(*c*) may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
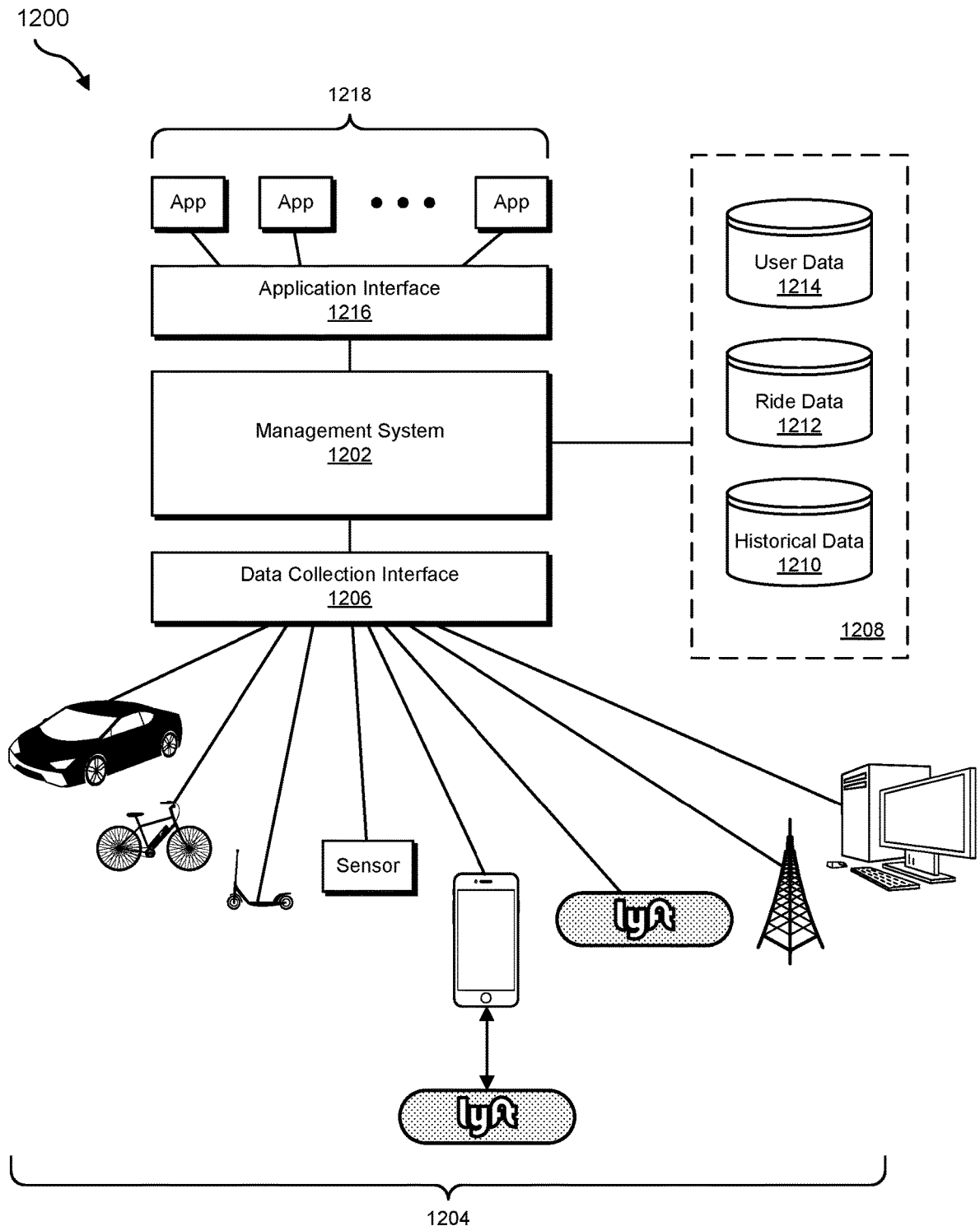
FIG. 12 shows a data collection and application management environment in accordance with various embodiments.

FIG. 12 shows a data collection and application management environment 1200 in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium (e.g., a non-transitory memory) accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

The present disclosure has set forth systems and methods for adapting a torque profile of a micromobility vehicle, such as an electric bike or scooter, based on various conditions, such as environmental conditions and ground surface conditions. Thus, a throttle position or torque magnitude may be scaled and/or limited based on various types of conditions. For example, adaptation of a torque profile based on automotive vehicle inclination may reduce deviation from a constant velocity at a given throttle position despite inclination changes. The inclination may be determined using an inclinometer (e.g., gyroscope) of the MV, and the torque profile may be reduced (e.g., multiplied by a scalar value greater than one) when the MV is level, declined, or inclined to a degree less than a threshold. Additionally, torque profile may be adapted based on weather conditions for improved safety. The weather conditions may be determined by the MV or received wirelessly from a weather station or other networked information source, and the torque profile may be reduced (e.g., multiplied by a scalar value greater than one)

or limited in the event of occurrence of precipitation in a predetermined time window preceding a current time, sub-zero temperatures, or other conditions that affect coefficient of friction of a ground surface. Also, torque profile may be adapted based on temperature to prevent damage to a battery of an electric vehicle. Received indications of weather conditions, sensed ambient temperature, and/or sensed battery temperature may further be used to limit torque magnitude when the temperature falls outside a temperature range for safe battery operation at an operational setpoint required to satisfy a torque magnitude above a temperature adjusted threshold. Still further, torque profile may be adapted based on a deviation from an expected vehicle load to reduce deviation from an expected MV response to demanded torque. The deviation from the expected vehicle load may be determined at initial operation of the automotive vehicle by comparing a change in vehicle position to a vehicle position that was expected in view of the expected load, an initial torque magnitude, and an initial passage of time. Torque profile may be increased (e.g., multiplied by a scalar value greater than one) to account for heavier than expected loads and reduced (e.g., multiplied by a scalar value less than one) for lighter than expected loads. The deviation from the expected load may be saved as part of a user profile and employed in future driving operations. The environmental torque profile adaptation reduces variation in driver experience due to variations in inclination and vehicle load, while improving safety in operation of the automotive vehicle.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive throttle input data to be transformed, transform the data, output a result of the transformation to control operation of a MV, use the result of the transformation as feedback to an iterative process, and store the result of the transformation to update a rider profile. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system, comprising:
a non-transitory memory; and
one or more hardware processors configured to execute instructions from the non-transitory memory to perform operations comprising:
receiving one or more sensor signals from one or more sensors of a micromobility vehicle;
determining, based on the one or more sensor signals, a deviation from an expected load of the micromobility vehicle;
determining a torque profile associated with the micromobility vehicle based on a skill level of a rider indicated in a user profile, wherein the torque profile is used to map a throttle position detected by the micromobility vehicle to a torque magnitude;
scaling the torque profile by a scalar value to produce a reduced range of torque magnitude, wherein the scalar value is determined based at least on the deviation from the expected load, wherein the expected load is a default gross weight of the micromobility vehicle for which the torque profile is initially calibrated;
determining the torque magnitude from the scaled torque profile based at least on the throttle position; and
sending drive instructions to a drive system of the micromobility vehicle in order to move the micromobility vehicle based at least on the determined torque magnitude.

2. The system of claim 1, wherein the scalar value is further determined based on one or more of environmental condition and ground surface condition, wherein the one or more of the environmental condition and the ground surface condition includes an inclination reading from an inclinometer of the micromobility vehicle, wherein the one or more sensors of the micromobility vehicle includes the inclinometer, and wherein the scaling the torque profile includes scaling at least one of the throttle position or the torque magnitude based on the inclination reading to reduce deviation from a constant velocity at a given throttle position despite inclination changes.

3. The system of claim 1, wherein the scalar value is further determined based on one or more of environmental condition and ground surface condition, wherein the one or more of the environmental condition and the ground surface condition includes one or more weather conditions, and wherein the scaling the torque profile includes reducing the torque magnitude in an event of the one or more weather conditions corresponding to occurrence of at least one of sub-zero temperatures or precipitation during a particular time period.

4. The system of claim 1, wherein the scalar value is further determined based on one or more of environmental condition and ground surface condition, wherein the one or more of the environmental condition and the ground surface condition includes a temperature, and wherein the scaling the torque profile includes reducing the torque magnitude to a level where a motor of the micromobility vehicle will not be operated with a voltage or electrical power draw that could cause damage to a battery during an associated temperature condition corresponding to the temperature.

5. The system of claim 1, wherein the scaling the torque profile includes scaling at least one of the throttle position or the torque magnitude in a manner configured to reduce deviation from an expected micromobility vehicle response to demanded torque.

6. The system of claim 5, wherein the instructions further cause the system to perform operations comprising:
determining the deviation from the expected load of the micromobility vehicle at initial operation of the micromobility vehicle by comparing a change in vehicle position to a vehicle position that was expected in view of the expected load, an initial torque magnitude, and an initial passage of time;
storing the deviation from the expected load in a user profile; and
employing the stored deviation in a subsequent driving operation by determining the initial torque magnitude for the subsequent driving operation based at least in part on the stored deviation.

7. A computer-implemented method comprising:
receiving one or more sensor signals from one or more sensors of a micromobility vehicle;
determining, based on the one or more sensor signals, a deviation from an expected load of the micromobility vehicle;
determining a torque profile associated with the micromobility vehicle based on a skill level of a rider indicated in a user profile, wherein the torque profile is used to map a throttle position detected by the micromobility vehicle to a torque magnitude;
scaling the torque profile by a scalar value to produce a reduced range of torque magnitude, wherein the scalar value is determined based at least on the deviation from the expected load, wherein the expected load is a default gross weight of the micromobility vehicle for which the torque profile is initially calibrated;
determining the torque magnitude from the scaled torque profile based at least on the throttle position; and
sending drive instructions to a drive system of the micromobility vehicle in order to move the micromobility vehicle based at least on the determined torque magnitude.

8. The method of claim 7, wherein the scalar value is further determined based on one or more of environmental condition and ground surface condition, and wherein the one or more of the environmental condition and the ground surface condition includes at least one of:
an inclinometer reading from an inclinometer of the micromobility vehicle, wherein the one or more sensors of the micromobility vehicle comprise the inclinometer;
one or more weather conditions at a location of the micromobility vehicle; or
a temperature at a location of the micromobility vehicle.

9. The method of claim 8, wherein the one or more of the environmental condition and the ground surface condition includes the inclinometer reading from the inclinometer of the micromobility vehicle, and wherein the scaling the torque profile includes scaling at least one of the throttle position or the torque magnitude based on the inclinometer reading to reduce deviation from a constant velocity at a given throttle position despite inclination changes.

10. The method of claim 9, wherein the scaling the torque profile includes reducing at least one of the throttle position or the torque magnitude when the micromobility vehicle is at least one of level, declined, or inclined to a degree less than a threshold.

11. The method of claim 8, wherein the one or more of the environmental condition and the ground surface condition includes the one or more weather conditions, and wherein the scaling the torque profile includes reducing the torque magnitude in an event of the one or more weather conditions corresponding to occurrence of at least one of sub-zero temperatures or precipitation during a particular time period.

12. The method of claim 11, wherein the one or more weather conditions are received wirelessly from a networked information source.

13. The method of claim 8, wherein the one or more of the environmental condition and the ground surface condition includes the temperature, and wherein the scaling the torque profile includes reducing the torque magnitude to a level where a motor of the micromobility vehicle will not be operated with a voltage or electrical power draw that could cause damage to a battery during an associated temperature condition corresponding to the temperature.

14. The method of claim 13, wherein the temperature corresponds to at least one of a received indication of a weather condition, a sensed ambient temperature, or a sensed battery temperature.

15. The method of claim 7, wherein the scaling the torque profile includes scaling at least one of the throttle position or the torque magnitude in a manner configured to reduce deviation from an expected micromobility vehicle response to demanded torque.

16. The method of claim 15, further comprising determining the deviation from the expected load of the micromobility vehicle at initial operation of the micromobility vehicle by comparing a change in vehicle position to a vehicle position that was expected in view of the expected load, an initial torque magnitude, and an initial passage of time.

17. The method of claim 16, further comprising:
storing the deviation from the expected load in a user profile; and
employing the stored deviation in a subsequent driving operation by determining the initial torque magnitude for the subsequent driving operation based at least in part on the stored deviation.

18. A non-transitory computer-readable storage medium comprising:
computer-readable instructions that, when executed by at least one processor of a computing device, cause the computing device to:
receive one or more sensor signals from one or more sensors of a micromobility vehicle;
determine, based on the one or more sensor signals, a deviation from an expected load of the micromobility vehicle;
determine a torque profile associated with the micromobility vehicle based on a skill level of a rider indicated in a user profile, wherein the torque profile is used to map a throttle position detected by the micromobility vehicle to a torque magnitude;
scaling the torque profile by a scalar value to produce a reduced range of torque magnitude, wherein the scalar value is determined based at least on the deviation from the expected load, wherein the expected load is a default gross weight of the micromobility vehicle for which the torque profile is initially calibrated;
determine the torque magnitude from the scaled torque profile based at least on the throttle position; and
send drive instructions to a drive system of the micromobility vehicle in order to move the micromobility vehicle based at least on the determined torque magnitude.

19. The system of claim 1, wherein the scaling the torque profile preserves curvature of the torque profile over the reduced range of torque magnitude.

20. The system of claim 1, wherein the deviation from the expected load of the micromobility vehicle is determined based on the one or more sensor signals from an accelerometer, a global positioning system (GPS) sensor, or a weight sensor.

* * * * *